(12) United States Patent
Oohara

(10) Patent No.: US 10,578,517 B2
(45) Date of Patent: Mar. 3, 2020

(54) MOTOR FAILURE DIAGNOSIS SYSTEM

(71) Applicant: FANUC CORPORATION, Minamitsuru-gun, Yamanashi (JP)

(72) Inventor: Taku Oohara, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/048,988

(22) Filed: Jul. 30, 2018

(65) Prior Publication Data

US 2019/0064033 A1 Feb. 28, 2019

(30) Foreign Application Priority Data

Aug. 28, 2017 (JP) ................. 2017-163773

(51) Int. Cl.
*G01M 13/045* (2019.01)
*G01M 15/12* (2006.01)

(52) U.S. Cl.
CPC .......... *G01M 13/045* (2013.01); *G01M 15/12* (2013.01)

(58) Field of Classification Search
CPC .... G01M 15/045; G01M 15/12; G01M 13/04; G01M 13/045
See application file for complete search history.

(56) References Cited

U.S. PATENT DOCUMENTS

| | | | | |
|---|---|---|---|---|
| 7,403,850 B1* | 7/2008 | Boutin | ................. | G01M 15/05 701/107 |
| 2002/0138217 A1* | 9/2002 | Shen | ..................... | G01H 1/003 702/56 |
| 2005/0071128 A1* | 3/2005 | Lindberg | ............... | G01H 1/003 702/187 |
| 2007/0067678 A1* | 3/2007 | Hosek | ................ | G05B 23/0235 714/25 |
| 2018/0059656 A1* | 3/2018 | Hiruta | ................ | G05B 23/0243 |
| 2019/0242787 A1* | 8/2019 | Suzuki | .................... | G01M 7/02 |

FOREIGN PATENT DOCUMENTS

| | | |
|---|---|---|
| JP | 7-240063 | 9/1995 |
| JP | 9-134216 | 5/1997 |
| JP | 2001-33353 | 2/2001 |
| JP | 2001-255241 | 9/2001 |
| JP | 2005-74545 | 3/2005 |
| JP | 2016-215311 | 12/2016 |

OTHER PUBLICATIONS

Notification of Reasons for Refusal dated Mar. 19, 2019 in corresponding Japanese Patent Application No. 2017-163773.

* cited by examiner

*Primary Examiner* — Helen C Kwok

(74) *Attorney, Agent, or Firm* — Wenderoth, Lind & Ponack, L.L.P.

(57) ABSTRACT

A motor failure diagnosis system includes: a motor having a rotating shaft and a bearing that receives the rotating shaft; a vibration sensor capable of detecting a vibration of the motor when the rotating shaft is a rotation state; the date information output unit capable of outputting date information; a vibration information storage unit that stores the vibration information detected by the vibration sensor and the date information output by the date information output unit in correlation; and a failure date identifying unit that identifies the date on which a failure occurred in the bearing of the motor on the basis of the vibration information and the date information stored in the vibration information storage unit.

4 Claims, 7 Drawing Sheets

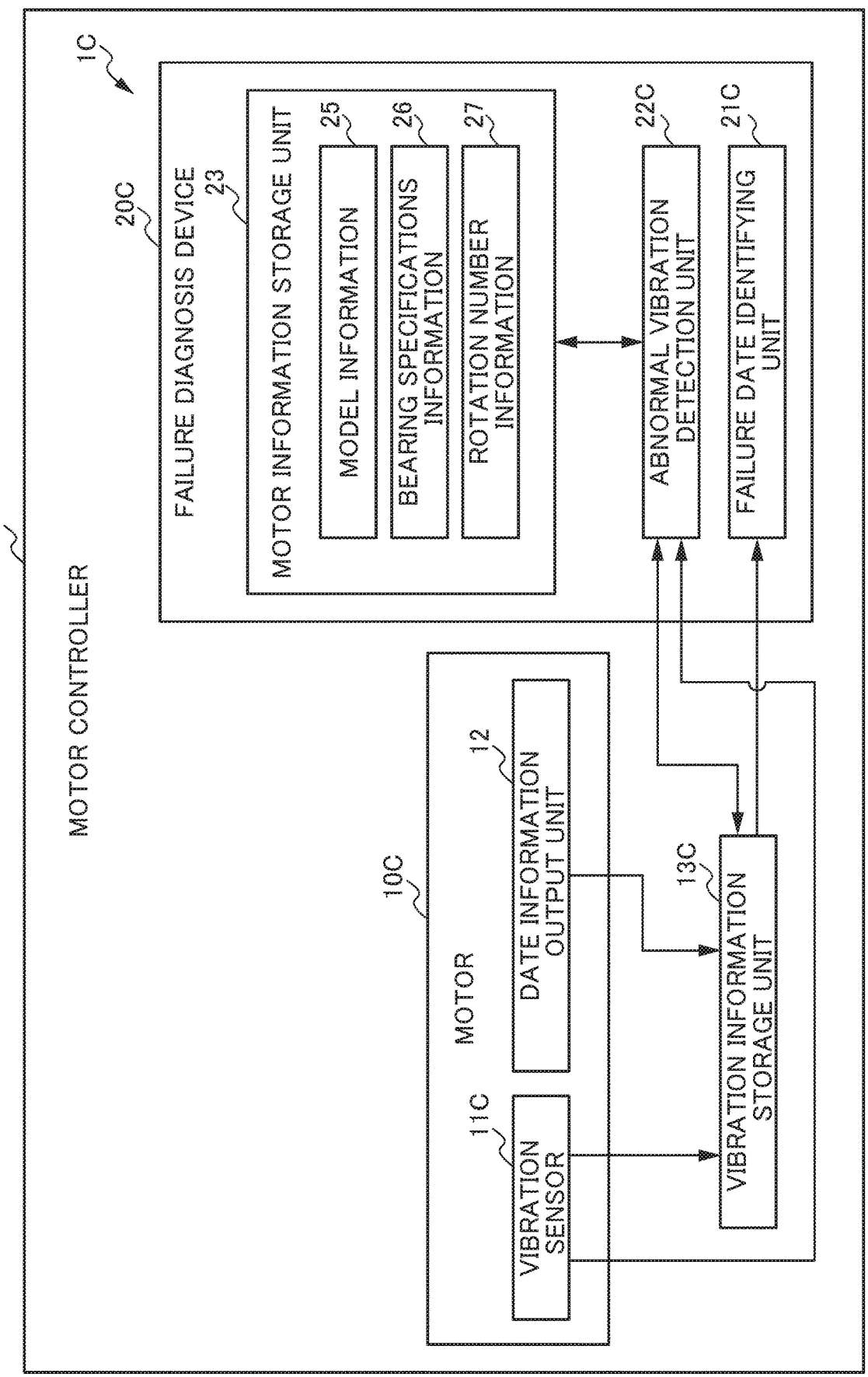

MOTOR FAILURE DIAGNOSIS SYSTEM

This application is based on and claims the benefit of priority from Japanese Patent Application No. 2017-163773, filed on 28 Aug. 2017, the content of which is incorporated herein by reference.

BACKGROUND OF THE INVENTION

Field of the Invention

The present invention relates to a motor failure diagnosis system capable of identifying the date on which a failure occurred in a bearing of a motor.

Related Art

Conventionally, a motor which is a driving source of a machining apparatus or the like is, for example, shipped and conveyed from a motor manufacturing plant and is connected to a spindle in a machining apparatus assembly plant. In this case, noise may be generated in a rotation state due to a scratch formed in a raceway surface or a ball of a bearing of the motor. Such a motor is returned to the motor manufacturing plant as a defective product. However, in many cases, it is unclear when and in which step the scratch was formed in the raceway surface or the ball of the bearing of the returned motor. Discovery of such a failure and identification of a failure occurrence time are very important in quality management and quality assurance.

In contrast, for example, a diagnosis device which has a vibration detector disposed in a bearing box and which observes a vibration frequency excluding a vibration frequency that has not a direct influence on a bearing abnormality among vibration frequencies from the vibration detector to correctly diagnose an abnormality due to a scratch or the like formed in the bearing even when a squeak noise is generated is proposed (for example, see Patent Document 1).

Moreover, a bearing diagnosis device which includes a vibration detector that detects vibration of a bearing of a rotor, a signal converter and recorder that converts a vibration signal detected by the vibration detector to an audio signal and records the audio signal, a plurality of vibration signal recorders that records and reproduces the audio signal, a diagnosing unit that analyzes the audio signal to diagnose a movement of the bearing, and a sound output unit that outputs sound on the basis of the audio signal and which is devised to recognize occurrence of a failure with the ears of persons is proposed (for example, see Patent Document 2).

Patent Document 1: Japanese Unexamined Patent Application, Publication No. 2001-33353
Patent Document 2: Japanese Unexamined Patent Application, Publication No. 2001-255241

SUMMARY OF THE INVENTION

However, the technique disclosed in Patent Document 1 aims to detect failures stably while eliminating the influence of squeak noise or the like as much as possible but does not teach a point of view that a vibration frequency is stored to verify the cause of occurrence of failures for a later use.

The technique disclosed in Patent Document 2 is characterized in converting a vibration signal to an audio signal and outputting a vibration in the event of an abnormality as sound and aims to help persons in recognizing the presence and the like of failures with the ears. In the technique of Patent Document 2, although the bearing diagnosis device includes a plurality of signal converter and recorders that records and reproduces a vibration signal, the bearing diagnosis device aims to be applied to various applications without being limited to real-time diagnosis by enabling the vibration signal to be recorded. In this way, the bearing diagnosis device aims to eliminate the need to arrange a number of detecting devices.

In contrast, from the perspective of quality management and quality assurance of motors, it is important to identify when and in which step a failure occurred in the bearing of a motor. Therefore, it is desirable to provide a device or a system capable of identifying a failure date.

An object of the present invention is to provide a motor failure diagnosis system capable of identifying the date on which a failure occurred in a bearing of a motor.

(1) The present invention provides a motor failure diagnosis system (for example, a motor failure diagnosis system 1, 1A, 1B, 1C to be described later) including: a motor (for example, a motor 10, 10B, 10C to be described later) having a rotating shaft and a bearing that receives the rotating shaft; a vibration sensor (for example, a vibration sensor 11, 11C to be described later) capable of detecting a vibration of the motor when the rotating shaft is in a rotation state; a date information output unit (for example, a date information output unit 12 to be described later) capable of outputting date information (for example, date information 42, 46 to be described later); a vibration information storage unit (for example, a vibration information storage unit 13, 13A, 13B, 13C to be described later) that stores vibration information (for example, vibration information 41 to be described later) detected by the vibration sensor and date information output, by the date information output unit in correlation; and a failure date identifying unit (for example, a failure date identifying unit 21, 21B, 21C to be described later) that identifies a date on which a failure occurred in the bearing of the motor on the basis of the vibration information and the date information stored in the vibration information storage unit.

(2) In the motor failure diagnosis system according to (1), the vibration sensor and the vibration information storage unit may be integrated with the motor.

(3) The motor failure diagnosis system according to (1) or (2) may further include: a motor information storage unit (for example, a motor information storage unit 23 to be described later) that stores motor information including model information (for example, model information 25 to be described later) of the motor, the bearing specifications information (for example, bearing specifications information 26 to be described later) and rotation number information (for example, rotation number information 27 to be described later) of the motor; and an abnormal vibration detecting unit (for example, an abnormal vibration detecting unit 22, 22C to be described later) capable of detecting abnormal vibration on the basis of the motor information stored in the motor information storage unit and the vibration information from the vibration sensor and outputting abnormal vibration information (for example, abnormal vibration information 45 to be described later) on the abnormal vibration to the vibration information storage unit, wherein the vibration information storage unit may store the abnormal vibration information output by the abnormal vibration detecting unit in correlation with the date information as vibration information.

(4) In the motor failure diagnosis system according to any one of (1) to (3), the vibration information storage unit may further store motor identification information (for example, serial number information 31 to be described later) for identifying the individual motors and stores the motor identification information in correlation with the vibration information and the date information.

According to the present invention, it is possible to provide a motor failure diagnosis system capable of identifying the date on which a failure occurred in a bearing of a motor.

BRIEF DESCRIPTION OF THE DRAWINGS

FIG. 7 is a block diagram illustrating a configuration of a motor failure diagnosis system according to a fourth embodiment.

DETAILED DESCRIPTION OF THE INVENTION

Figure 1:
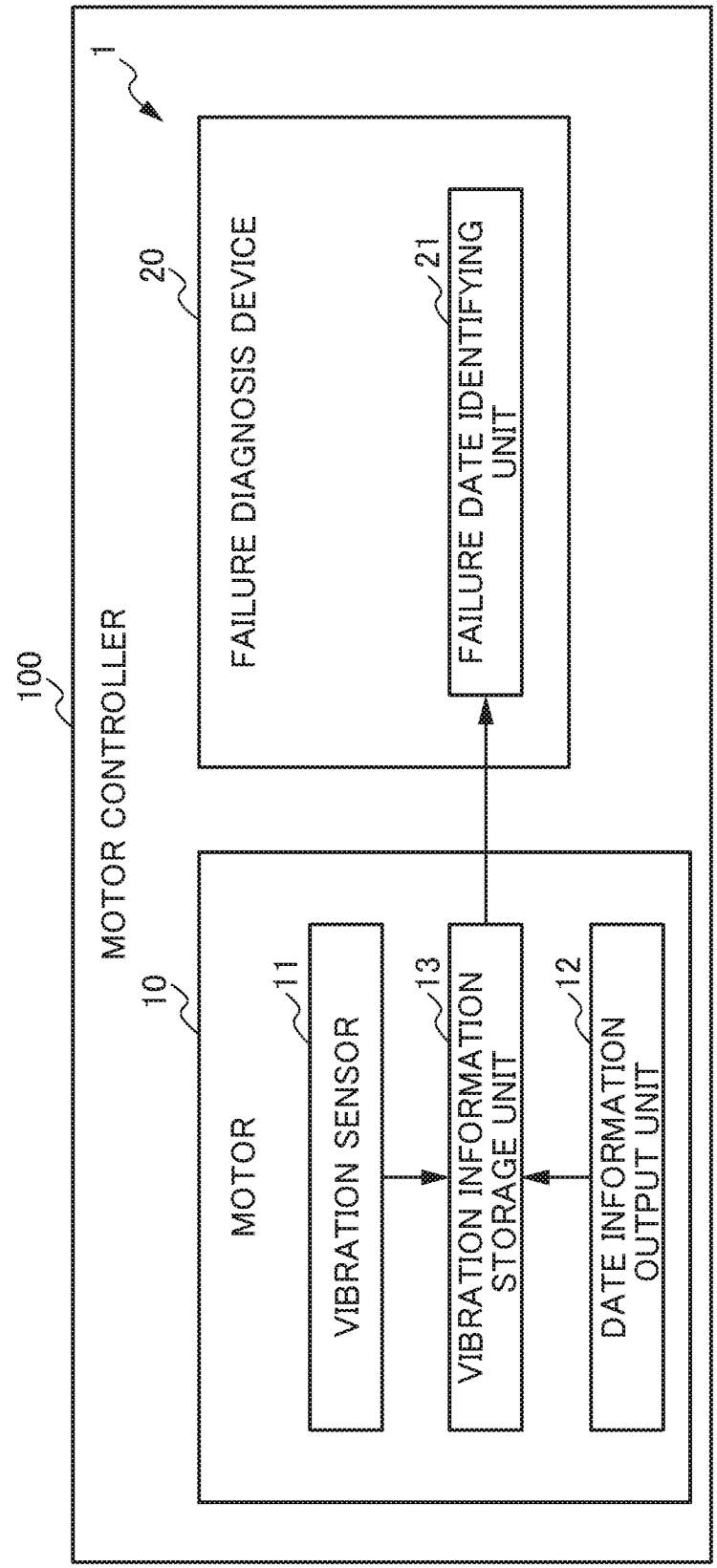
FIG. 1 is a block diagram illustrating a configuration of a motor failure diagnosis system according to a first embodiment.

Hereinafter, embodiments of the present invention will be described with reference to the drawings. In description of the second and subsequent embodiments, components common to the first embodiment will be denoted by the same reference numerals, and the description thereof will be omitted.

First Embodiment

Figure 2:
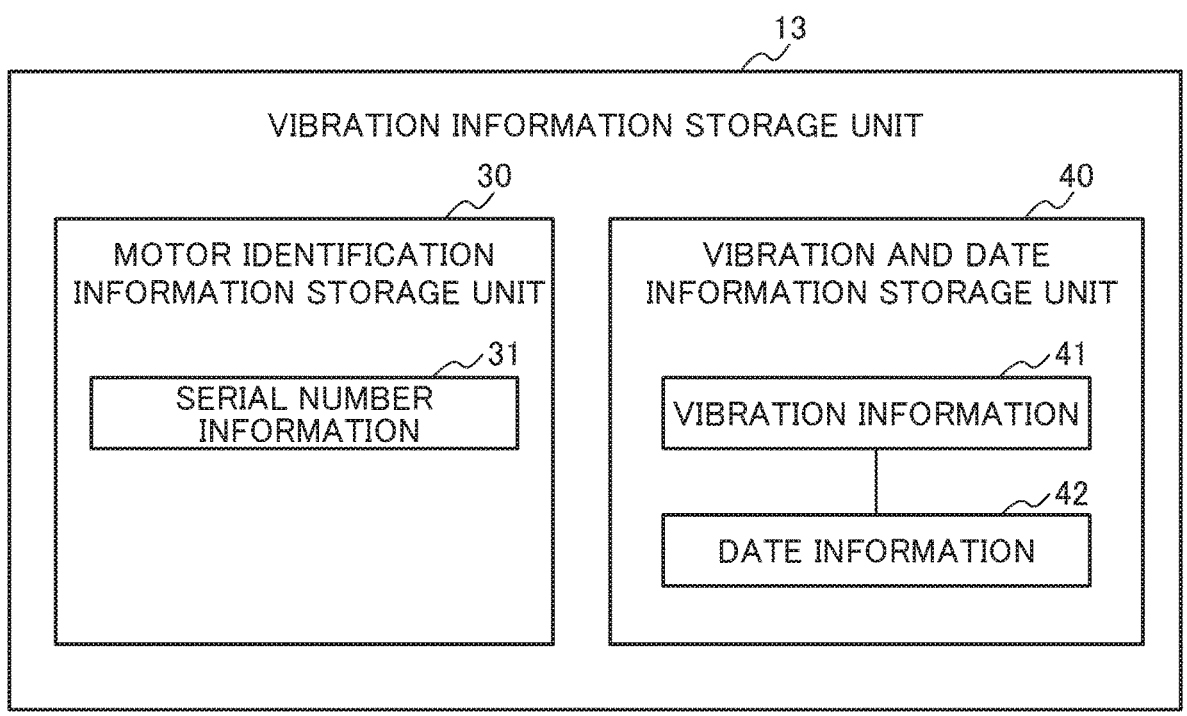
FIG. 2 is a block diagram illustrating a configuration of a vibration information storage unit according to the first embodiment.

A configuration of a motor failure diagnosis system according to a first embodiment will be described with reference to FIGS. 1 and 2. FIG. 1 is a block diagram illustrating a configuration of a motor failure diagnosis system according to the first embodiment. FIG. 2 is a block diagram illustrating a configuration of a vibration information storage unit according to the first embodiment.

As illustrated in FIG. 1, a motor failure diagnosis system 1 according to the present embodiment includes a motor 10 and a failure diagnosis device 20. In the present embodiment, the failure diagnosis device 20 forms a part of a motor controller 100. The motor failure diagnosis system 1 of the present embodiment forms a part of the motor controller 100 in the state that the motor 10 is attached to the motor controller 100.

As illustrated in FIG. 1, the motor 10 of the present embodiment includes a rotating shaft (not illustrated), a bearing (not illustrated), a vibration sensor 11, a date information output unit 12, and a vibration information storage unit 13. Moreover, the failure diagnosis device 20 of the present embodiment has a failure date identifying unit 21.

The motor 10 is configured to be attachable to the motor controller 100. The motor 10 is configured so that the rotating shaft can rotate in a state of being attached to the motor controller 100. In a state in which a scratch is formed in the rotating shaft or the bearing, for example, a vibration (an abnormal vibration) different from a vibration (a normal vibration) in a normal state (a normal rotation state) is generated.

In the present embodiment, the vibration sensor 11 is integrated with (incorporated into) the motor 10. The vibration sensor 11 is configured to be able to detect a vibration of the motor 10 in a rotation state of the rotating shaft. The vibration sensor 11 is configured to be able to output vibration information such as an amplitude, a frequency, and the like of the detected vibration to the vibration information storage unit 13.

In the present embodiment, the date information output unit 12 is integrated with (incorporated into) the motor 10. The date information output unit 12 is configured to output date information to the vibration information storage unit 13. The date information may be information in units of days, hours, minutes, seconds, and the like depending on required precision or the like of information.

As illustrated in FIG. 1, in the present embodiment, the vibration information storage unit 13 is integrated with (incorporated into) the motor 10. Moreover, as illustrated in FIG. 2, the vibration information storage unit 13 has a motor identification information storage unit 30 and a vibration and date information storage unit 40.

The motor identification information storage unit 30 stores information for identifying individual motors. In the present embodiment, the motor identification information storage unit 30 stores serial number information 31. The vibration and date information storage unit 40 (the vibration information storage unit 13) stores vibration information 41 detected by the vibration sensor 11 and date information 42 output by the date information output unit 12 in correlation. Here, the vibration and date information storage unit 40 (the vibration information storage unit 13) is configured to store vibration information successively or intermittently. Moreover, the vibration and date information storage unit 40 (the vibration information storage unit 13) may be set to store vibration information (abnormal vibration information or vibration information in the event of failures) only from which vibration information corresponding to a normal vibration of the motor 10 is eliminated by a filter or the like.

As illustrated in FIG. 1, the failure date identifying unit 21 is configured to be able to acquire the vibration information 41 and the date information 42 correlated with the vibration information 41 from the vibration information storage unit 13. The failure date identifying unit 21 is configured to be able to detect presence of occurrence of a failure in the bearing of the motor on the basis of the vibration information 41 and identify the date on which a failure occurred in the bearing of the motor on the basis of the date information 42. The failure date identifying unit 21 is configured to be able to detect occurrence of a failure in the bearing of the motor by comparing the vibration information 41 stored in the vibration information storage unit 13 and detecting abnormal vibration information.

Figure 3:
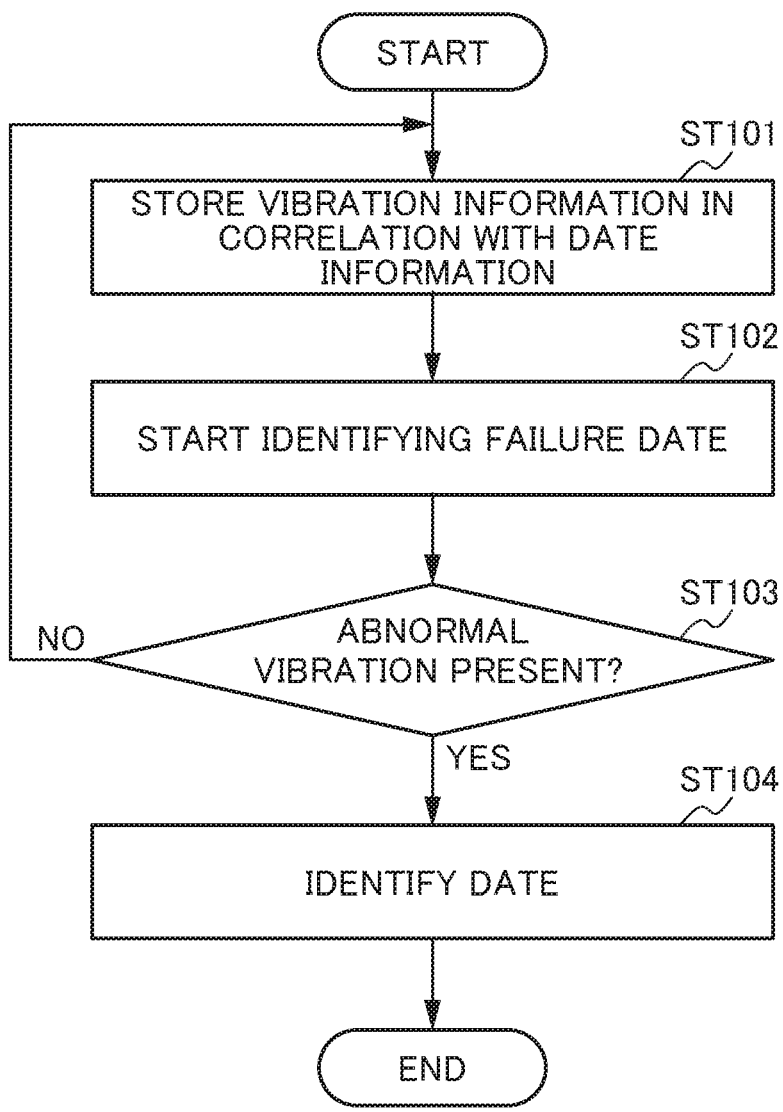
FIG. 3 is a flowchart illustrating an operation of the motor failure diagnosis system according to the first embodiment.

An operation of the motor failure diagnosis system according to the first embodiment will be described with reference to FIG. 3. FIG. 3 is a flowchart illustrating an operation of the motor failure diagnosis system according to the first embodiment. First, in step ST101, the vibration information storage unit 13 stores the vibration information from the vibration sensor 11 and the date information from the date information output unit 12 in correlation. The vibration information storage unit 13 stores the vibration information from the vibration sensor 11 successively or intermittently and stores the vibration information and the date information in correlation.

Subsequently, in step ST102, for example, in response to a diagnosis start instruction or the like issued to the failure diagnosis device 20, the failure date identifying unit 21 starts identifying the presence of an abnormal vibration (presence of failure) and the date of occurrence of the abnormal vibration on the basis of the vibration information and the date information stored in the vibration information storage unit 13.

Subsequently, in step ST103, the failure date identifying unit 21 analyzes the vibration information and checks whether an abnormal vibration is present. The failure date identifying unit 21 detects the presence of an abnormal vibration (an abnormal amplitude, an abnormal frequency, and the like) on the basis of normal vibration information (vibration information in a normal rotation state) set for each type of the motor 10, for example. When the failure date identifying unit 21 has detected the abnormal vibration (NO), the flow returns to step ST101. When the failure date identifying unit 21 has not detected the abnormal vibration (YES), the flow proceeds to step ST104.

Subsequently, in step ST104, the failure date identifying unit 21 acquires information on the date on which the abnormal vibration occurred from the vibration information storage unit 13. The failure date identifying unit 21 specifies the occurrence date of the abnormal vibration on the basis of the vibration information and the date information stored in the vibration information storage unit 13 in correlation.

The failure date identifying unit 21 outputs information (for example, an abnormal amplitude and an abnormal frequency) on the abnormal vibration and the date information on occurrence of the abnormal vibration to a failure date output unit (for example, a monitor), for example. In this way, an operator or an administrator can check the time at which a failure occurred in the bearing.

The failure date identifying unit 21 may be configured to output the serial number information which is motor identification information for specifying individual motors stored in the vibration information storage unit 13 and the abnormal vibration information and the date information in correlation. In this case, by configuring the failure diagnosis device 20 to be able to refer to information such as, for example, a manufacturing plant and line, a manufacturing date, a conveying route, and the like, it is possible to provide the motor failure diagnosis system 1 capable of outputting information helpful in analyzing the cause of occurrence of failures.

According to the present embodiment, the following advantages are obtained. According to the present embodiment, it is possible to provide the motor failure diagnosis system capable of identifying the date on which a failure occurred in a motor by storing information on a vibration of the motor in a rotation state and the date information in correlation.

The motor failure diagnosis system 1 of the present embodiment includes: the motor 10 having a rotating shaft and a bearing that receives the rotating shaft; the vibration sensor 11 capable of detecting a vibration of the motor 10 when the rotating shaft is a rotation state; the date information output unit 12 capable of outputting date information; the vibration information storage unit 13 that stores the vibration information detected by the vibration sensor 11 and the date information output by the date information output unit 12 in correlation; and the failure date identifying unit 21 that identifies the date on which a failure occurred in the bearing of the motor 10 on the basis of the vibration information and the date information stored in the vibration information storage unit 13. Due to this, the motor failure diagnosis system 1 can identify the date on which a failure occurred in the bearing of the motor 10 accurately and quickly for later use.

According to the present embodiment, the vibration sensor 11 and the vibration information storage unit 13 are integrated with the motor 10. Due to this, since a vibration of the motor 10 is detected and the vibration information is stored, it is possible to provide the motor failure diagnosis system 1 suitable for diagnosing an abnormal vibration (failures) of individual motors. This embodiment is suitable for diagnosing individual failures for later use.

According to the present embodiment, the vibration information storage unit 13 further stores motor identification information (for example, serial number information) for identifying the individual motors 10 and stores the motor identification information in correlation with the vibration information and the date information. Due to this, the motor failure diagnosis system 1 can refer to information such as, for example, a manufacturing plant and line, a manufacturing date, and a conveying route on the basis of the motor identification information (for example, the serial number information) and output information helpful in analyzing the cause of occurrence of failures. Due to this, it is possible to provide the motor failure diagnosis system 1 capable of identifying the cause of failures occurred in a motor bearing or the step where the failures occurred more accurately. Due to this, it is possible to provide the motor failure diagnosis system 1 more helpful in quality management and quality assurance of motors.

Second Embodiment

A motor failure diagnosis system according to a second embodiment will be described with reference to FIGS. 4 and 5. FIG. 1 is a block diagram illustrating a configuration of the motor failure diagnosis system according to the second embodiment. FIG. 5 is a block diagram illustrating a configuration of a vibration information storage unit according to the second embodiment. A motor failure diagnosis system 1A according to the second embodiment detects an abnormal vibration on the basis of the vibration information detected by the vibration sensor 11 and stores information on the detected abnormal vibration in a vibration information storage unit 13A. Hereinafter, components different from those of the motor failure diagnosis system 1 of first embodiment will be described, and the description of the same components as those of the first embodiment will be omitted.

Figure 4:
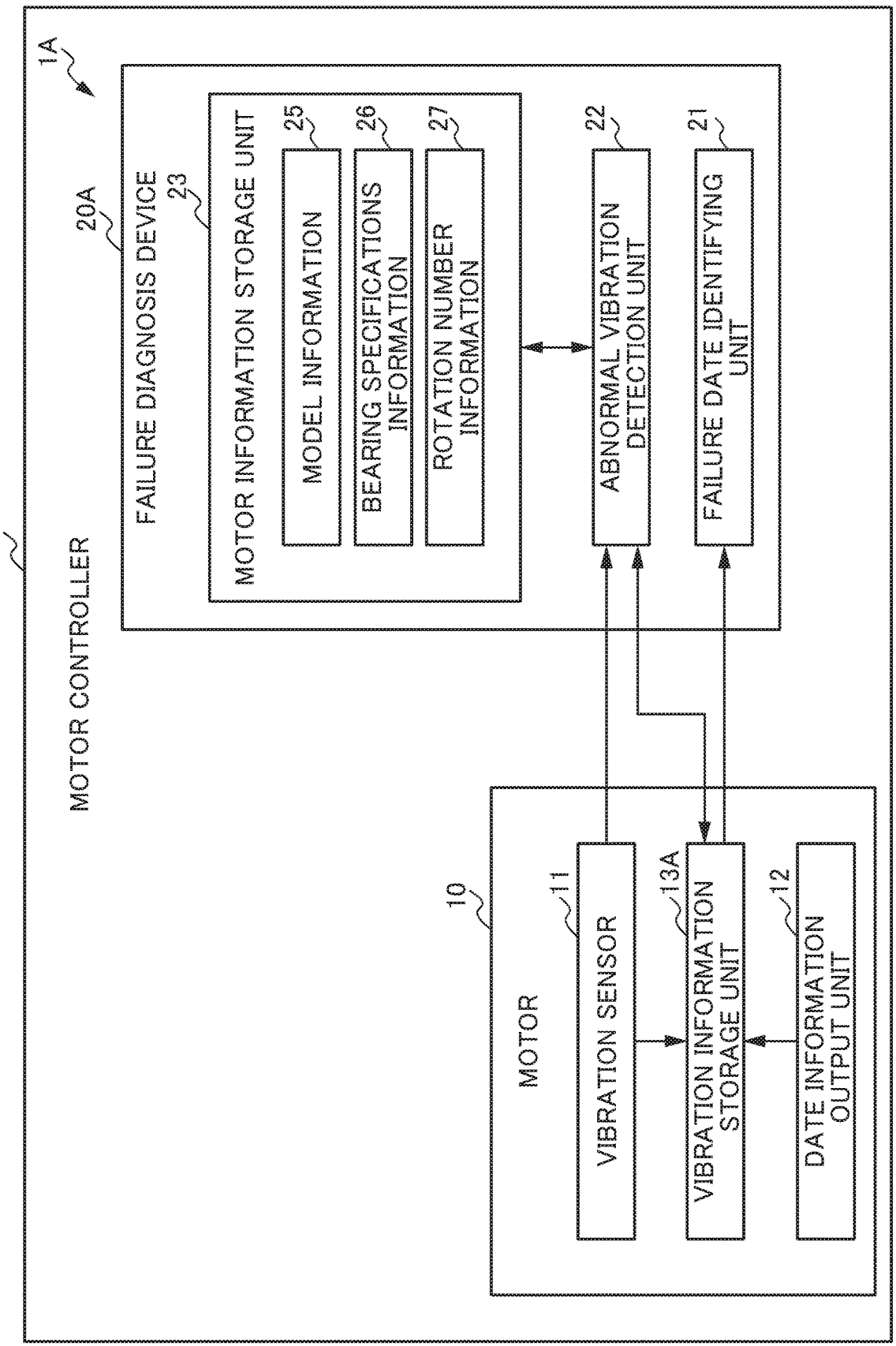
FIG. 4 is a block diagram illustrating a configuration of a motor failure diagnosis system according to a second embodiment.
Figure 5:
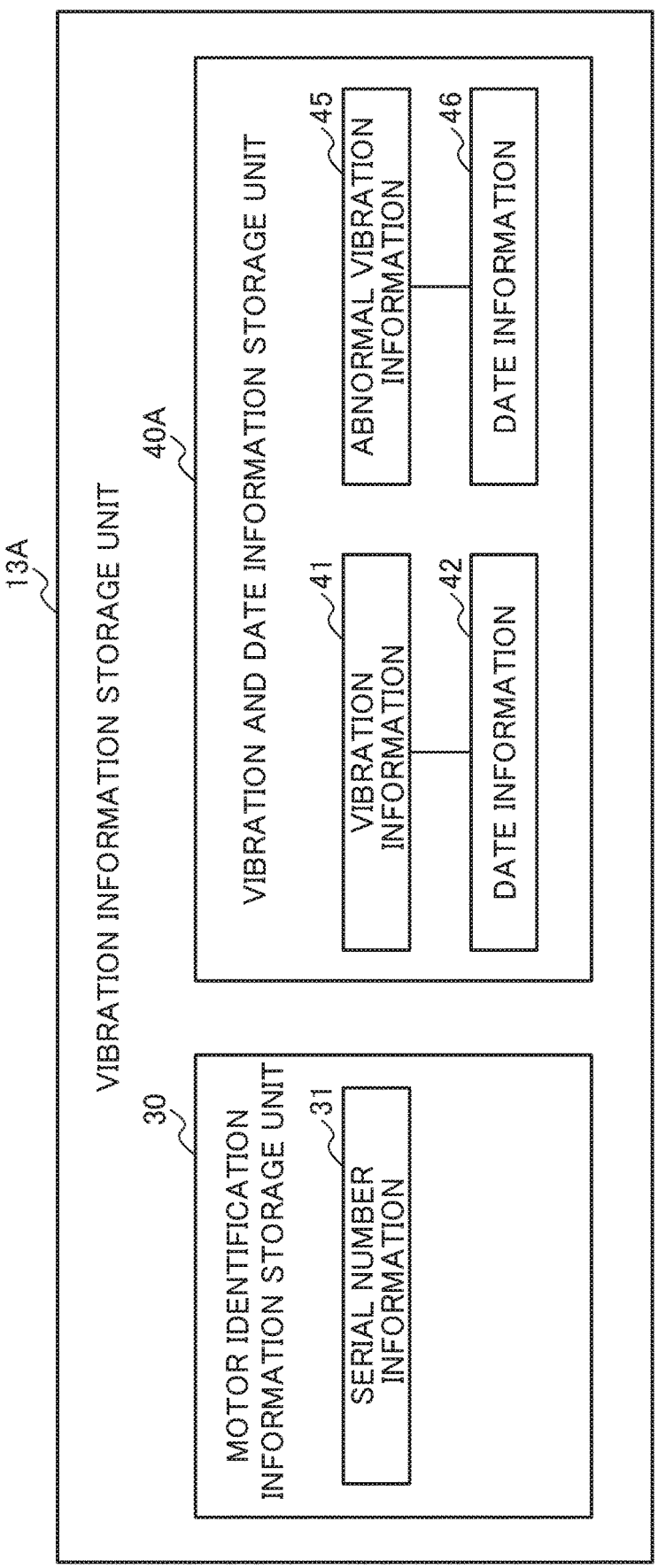
FIG. 5 is a block diagram illustrating a configuration of a vibration information storage unit according to the second embodiment.

As illustrated in FIG. 4, a failure diagnosis device 20A further includes an abnormal vibration detecting unit 22 and a motor information storage unit 23 in addition to the failure date identifying unit 21. As illustrated in FIG. 4, the motor information storage unit 23 stores motor information. The motor information storage unit 23 stores motor model information 25 as the motor information, bearing specifications information 26, and motor rotation number information 27. The motor information storage unit 23 is configured to be able to output the model information 25, the bearing specifications information 26, and the rotation number information 27 to the abnormal vibration detecting unit 22.

The abnormal vibration detecting unit 22 is configured to detect an abnormal vibration on the basis of the motor information stored in the motor information storage unit 23 and the vibration information from the vibration sensor 11 and output abnormal vibration information on the abnormal vibration to the vibration information storage unit 13A.

Specifically, first, the abnormal vibration detecting unit 22 calculates normal vibration information in a normal rotation state of the motor 10 on the basis of the model information 25, the bearing specifications information 26, and the rotation number information 27 from the motor information storage unit 23. In the present embodiment, for example, the model of the motor may be identified on the basis of the motor identification information (the serial number information 31) stored in the vibration information storage unit 13A, for example, to acquire the model information 25, the bearing specifications information 26, and the rotation number information 27 corresponding thereto. Subsequently, file abnormal vibration detecting unit 22 compares the vibration information from the vibration sensor 11 and the normal vibration information and detects the presence of occurrence of the abnormal vibration. Upon detecting the occurrence of the abnormal vibration, the abnormal vibration detecting unit 22 outputs information on the abnormal vibration to the vibration information storage unit 13A.

The vibration information storage unit 13A stores the abnormal vibration information output by the abnormal vibration detecting unit 22 in correlation with the date information as the vibration information. Specifically, as illustrated in FIG. 5, the vibration and date information storage unit 40A of the vibration information storage unit 13A stores the vibration information 41 and the date information 42 in correlation and stores the abnormal vibration information 45 and the date information 46 in correlation.

As illustrated in FIGS. 4 and 5, the failure date identifying unit 21 is configured to identify the occurrence of an abnormal vibration (failures) and the occurrence date on the basis of the abnormal vibration information 45 and the date information 46 as the vibration information and the date information stored in correlation in the vibration information storage unit 13A. Here, the failure date identifying unit 21 may perform detailed analysis on the basis of the vibration information 41 and the date information 42 stored successively or intermittently and identify the occurrence of an abnormal vibration and the occurrence date.

According to the second embodiment, the following advantages in addition to the advantages of the first embodiment are obtained. The motor failure diagnosis system 1A of the second embodiment further includes: the motor information storage unit 23 that stores motor information including the motor model information 25, the bearing specifications information 26, and the motor rotation number information 27; and the abnormal vibration detecting unit 22 capable of detecting the abnormal vibration on the basis of the motor information stored in the motor information storage unit 23 and the vibration information from the vibration sensor 11 and outputting the abnormal vibration information 45 on the abnormal vibration to the vibration information storage unit 13A. The vibration information storage unit 13A stores the abnormal vibration information 45 output by the abnormal vibration detecting unit 22 in correlation with the date information 46 as the vibration information. Due to this, since the motor failure diagnosis system 1A can calculate normal vibration information in a normal rotation state according to the type of a motor, it is possible to calculate normal vibration information corresponding to a use state and to detect an abnormal vibration accurately.

Third Embodiment

Figure 6:
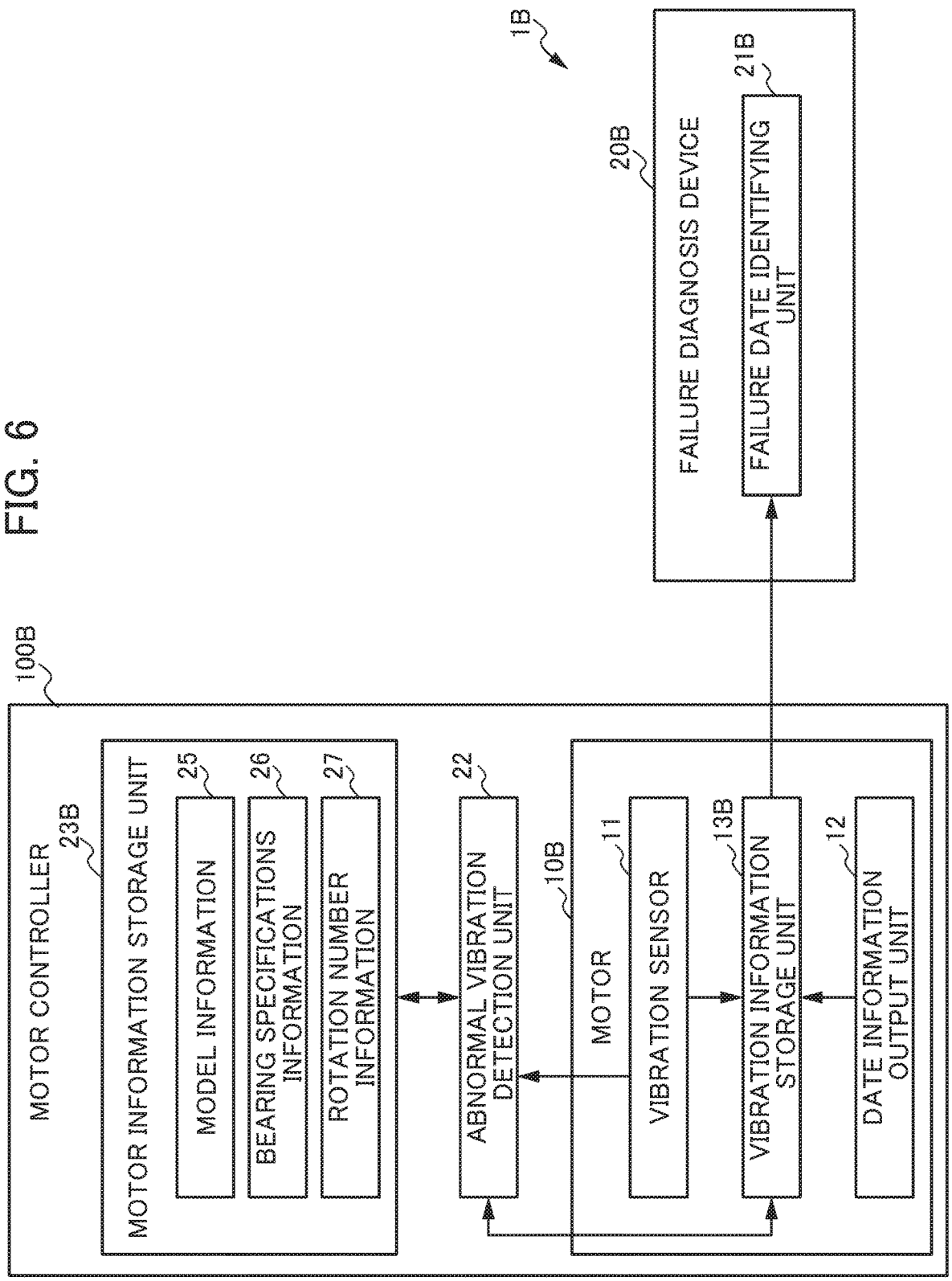
FIG. 6 is a block diagram illustrating a configuration of a motor failure diagnosis system according to a third embodiment.

A configuration of a motor failure diagnosis system 1B according to a third embodiment will be described with reference to FIG. 6. FIG. 6 is a block diagram illustrating a configuration of the motor failure diagnosis system according to the third embodiment. The motor failure diagnosis system 1B according to the third embodiment is a modification of the motor failure diagnosis system 1A of the second embodiment and is an example in which a failure diagnosis device (a failure date identifying unit) is disposed outside a motor controller. Hereinafter, components different from those of the first or second embodiment will be described, and the description of the same components as those of the first or second embodiment will be omitted.

As illustrated in FIG. 6, in the motor failure diagnosis system 1B of the third embodiment, a failure diagnosis device 20B is disposed outside a motor controller 100B. In the present embodiment, for example, when noise or an abnormal diagnosis result is generated from the motor 10B, the failure diagnosis device 20B may be connected to the motor controller 100B (the vibration information storage unit 13B) to identify whether a failure occurred in a motor and a failure occurrence date.

According to the third embodiment, the following advantages in addition to the advantages of the first and second embodiments are obtained. According to the present embodiment, as described above, when noise or an abnormal diagnosis result is generated from the motor 10B, the failure diagnosis device 20B may be connected to the motor controller 100B (the vibration information storage unit 13B) to identify whether a failure occurred in a motor and a failure occurrence date. According to the present embodiment, one failure diagnosis device 20B (one failure date identifying unit 21B) is sufficient for a plurality of motor controllers 100B. Due to this, the cost burden is reduced.

Fourth Embodiment

A configuration of a motor failure diagnosis system 1C according to a fourth embodiment will be described with reference to FIG. 7. FIG. 7 is a block diagram illustrating a configuration of a motor failure diagnosis system act the fourth embodiment. The motor failure diagnosis system 1C of the present embodiment is a modification of the motor failure diagnosis system 1A of the second embodiment and is an example in which a vibration information storage unit 13C is disposed outside a motor 10C. Hereinafter, components different from those of the first to third embodiments will be described, and the description of the same components as those of the first to third embodiment will be omitted.

As illustrated in FIG. 7, in the motor failure diagnosis system 1B of the third embodiment, the vibration information storage unit 13C is disposed outside the motor 10C. In the present embodiment, a vibration sensor 11C and the date information output unit 12 are incorporated into the motor 10C, and the vibration information storage unit 13C is disposed in a motor controller 100C. In the present embodiment, for example, the motor 10C has a vibration information output unit (such as a communication unit, an output terminal, or the like) (not illustrated) and is configured to be able to output the detected vibration information to the vibration information storage unit 13C.

According to the present embodiment, for example, the vibration information of a plurality of motors used can be stored in the vibration information storage unit 13C. Due to this, the cause of failures can be analyzed in more detail on the basis of a comparison between motor types, a relation between driving conditions, and a comparison between motor controllers in addition to the failure occurrence date.

According to the fourth embodiment, the following advantages in addition to the advantages of the first to third embodiments are obtained. According to the present embodiment, since the vibration information storage unit 13C is disposed outside the motor 10C, it is possible to form the motor in a simple structure and to manufacture the same at a low cost.

According to the present embodiment, for example, the vibration information of a plurality of motors used can be stored in the vibration information storage unit 13C. Due to this, the cause of failures can be analyzed in more detail on the basis of a comparison between motor types, a relation between driving conditions, and a comparison between motor controllers in addition to the failure occurrence date.

Although the first to fourth embodiments have been described, the present invention is not limited to these embodiments. Naturally, modifications, improvements, and the like within a range where the object of the present invention can be achieved also fall within the scope of the present invention. For example, the date information output unit may not be disposed in the motor but may be disposed in the motor controller and the failure diagnosis device.

EXPLANATION OF REFERENCE NUMERALS 1, 1A, 1B, 1C: Motor failure diagnosis system
10, 10B, 10C: Motor
11, 11C: Vibration sensor
12: Date information output unit
13, 13A, 13B, 13C: Vibration information storage unit
21, 21B, 21C: Failure date identifying unit
22, 22C: Abnormal vibration detecting unit
23: Motor information storage unit
25: Model information
26: Bearing specifications information
27: Rotation number information
31: Serial number information
41: Vibration information
42: Date information
45: Abnormal vibration information
46: Date information

What is claimed is:

1. A motor failure diagnosis system comprising:
a motor having a rotating shaft and a bearing that receives the rotating shaft;
a vibration sensor capable of detecting a vibration of the motor when the rotating shaft is in a rotation state;
a date information output unit capable of outputting date information;
a vibration information storage unit that stores vibration information detected by the vibration sensor and date information output by the date information output unit in correlation; and
a failure date identifying unit that identifies a date on which a failure occurred in the bearing of the motor on the basis of the vibration information and the date information stored in the vibration information storage unit, wherein the motor failure diagnosis system comprises:
a motor information storage unit that stores motor information including model information of the motor, specifications information of the bearing and rotation number information of the motor; and
an abnormal vibration detecting unit capable of detecting abnormal vibration on the basis of the motor information stored in the motor information storage unit and the vibration information from the vibration sensor and outputting abnormal vibration information on the abnormal vibration to the vibration information storage unit, and wherein
the vibration information storage unit stores the abnormal vibration information output by the abnormal vibration detecting unit in correlation with the date information as vibration information.

2. The motor failure diagnosis system according to claim 1, wherein the vibration information storage unit further stores motor identification information for identifying individual motors and stores the motor identification information in correlation with the vibration information and the date information.

3. A motor failure diagnosis system comprising:
a motor having a rotating shaft and a bearing that receives the rotating shaft;
a vibration sensor capable of detecting a vibration of the motor when the rotating shaft is in a rotation state;
a date information output unit capable of outputting date information;
a vibration information storage unit that stores vibration information detected by the vibration sensor and date information output by the date information output unit in correlation; and
a failure date identifying unit that identifies a date on which a failure occurred in the bearing of the motor on the basis of the vibration information and the date information stored in the vibration information storage unit; wherein
the vibration information storage unit further stores motor identification information for identifying individual motors and stores the motor identification information in correlation with the vibration information and the date information.

4. The motor failure diagnosis system according to claim 1, wherein the vibration sensor and the vibration information storage unit are integrated with the motor.

\* \* \* \* \*